Feb. 6, 1940.                    H. C. CARTER                    2,189,511
                    DIAPHRAGM DAMPER CONTROL FOR STOKERS
                  Filed Aug. 17, 1936            3 Sheets-Sheet 1
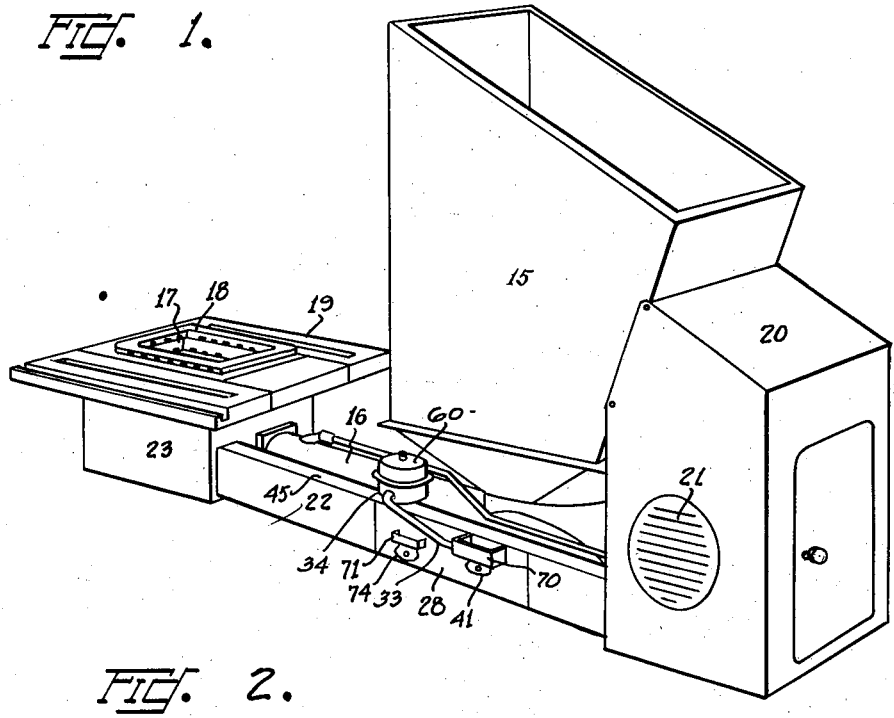
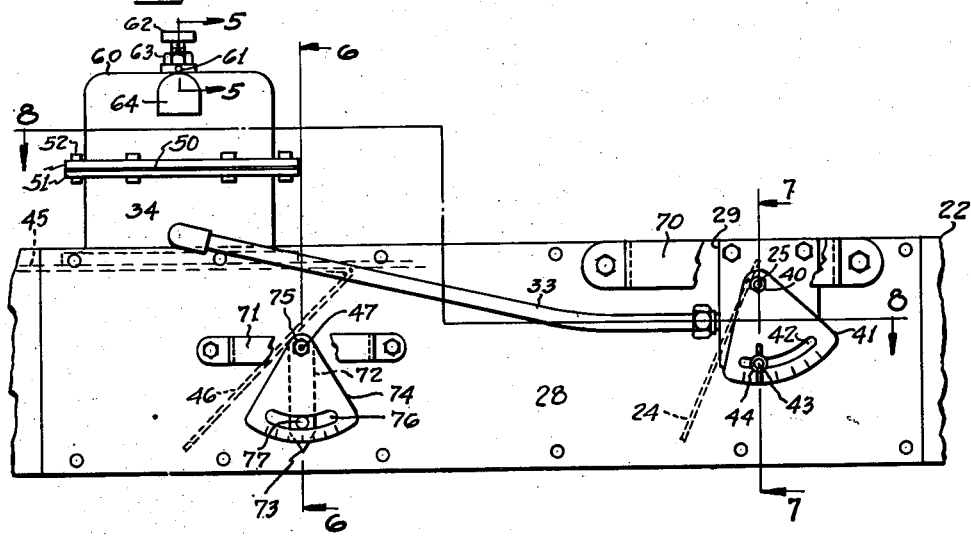
INVENTOR
H. C. CARTER
BY
ATTORNEY Feb. 6, 1940. H. C. CARTER 2,189,511
DIAPHRAGM DAMPER CONTROL FOR STOKERS
Filed Aug. 17, 1936 3 Sheets-Sheet 2

INVENTOR
H. C. CARTER
BY
ATTORNEY

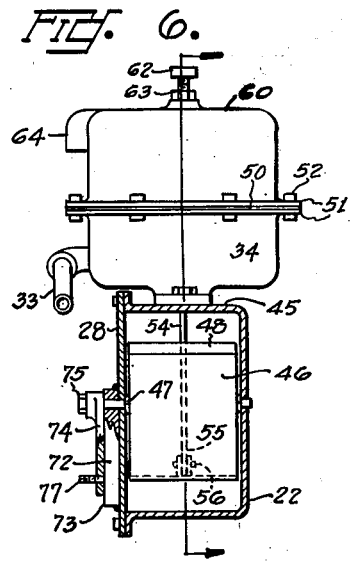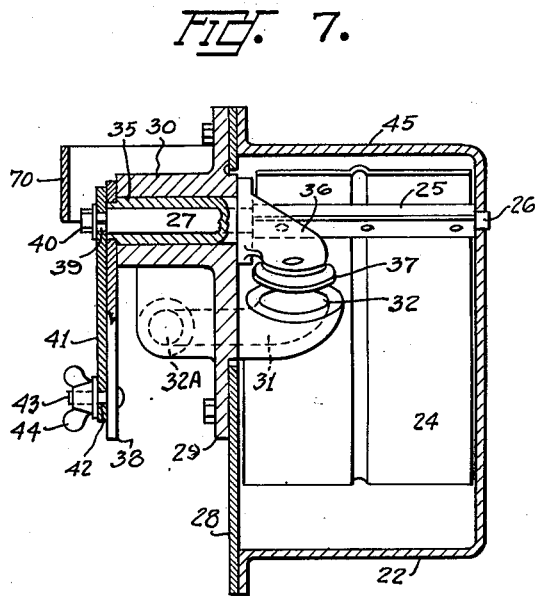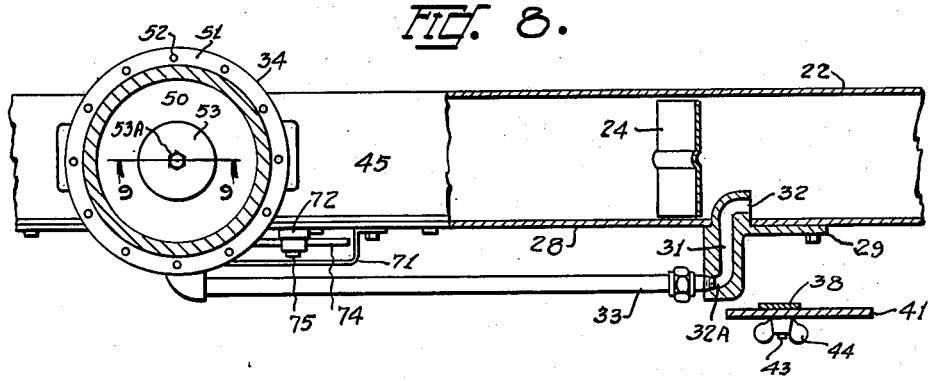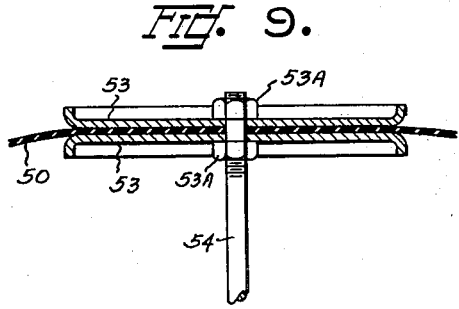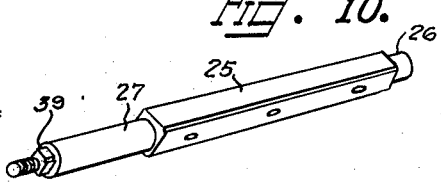

Patented Feb. 6, 1940

2,189,511

UNITED STATES PATENT OFFICE 2,189,511

DIAPHRAGM DAMPER CONTROL FOR STOKERS

Haskell C. Carter, Portland, Oreg., assignor to Iron Fireman Manufacturing Company, Portland, Oreg.

Application August 17, 1936, Serial No. 96,425

1 Claim. (Cl. 137—153)

This invention relates generally to stokers and particularly to a diaphragm damper control therefor.

The main object of this invention is the provision of an operating control for a stoker employing a flexible diaphragm of rubber or other lightweight material in the actuating mechanism.

The second object is the incorporation of a dash pot mechanism within the actuator.

The third object is the incorporation of a flap valve at the inlet opening of the operating air pickup.

I accomplish these and other objects in the manner set forth in the following specification as illustrated in the accompanying drawings, in which:

Fig. 1 is a perspective view of a stoker.

Fig. 2 is a fragmentary side elevation of the air duct showing the location of the actuator, the pilot vane, and control damper.

Fig. 6 is a section taken along the line 6—6 in Fig. 2.

Fig. 7 is a section taken along the line 7—7 in Fig. 2.

Fig. 8 is a section taken along the line 8—8 in Fig. 2.

Fig. 9 is a fragmentary section through the diaphragm taken along the line 9—9 in Fig. 8.

Fig. 10 is a perspective view of the control damper shaft.

Similar numbers of reference refer to similar parts throughout the several views.

Figure 3:
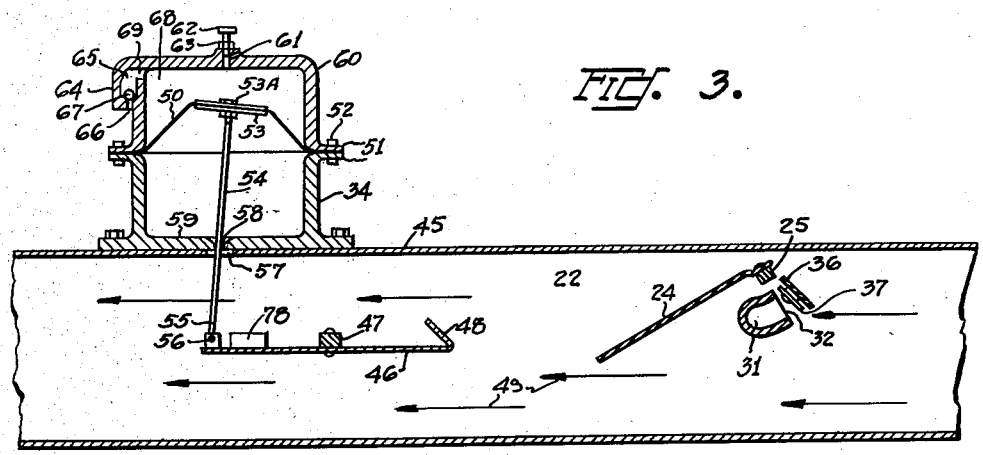
Fig. 3 is a vertical section taken along the line 3—3 in Fig. 6 showing the control damper completely open.

Referring in detail to the drawings, there is shown a coal hopper 15 from which coal is conveyed through a coal tube 16 to a retort 17 which is surrounded by tuyères 18 and plates 19 such as are commonly employed in stokers. Coal is caused to be moved through the tube 16 by means of a worm not shown which is driven by a suitable prime mover into the casing 20. Within the casing 20 is contained a fan which draws air through the louvers 21 and discharges it through the air duct 22 into the plenum chamber within the wind box 23. Within the air duct 22 is mounted a pilot vane 24 which is secured to the square shaft 25 whose rounded ends 26 and 27 are supported at opposite sides of the air duct 22. A cover plate 28 forms a portion of the front of the air duct 22. On the cover plate 28 is mounted a bracket 29 on which is formed a hub 30. Formed in the bracket 29 is an air passage 31 whose inlet opening 32 faces in the direction of the fan and whose outlet opening 32A is connected by means of a pipe 33 to the lower portion of the actuator 34, which will be described later in detail.

Rockably mounted in the hub 30 is a sleeve 35 on whose inner end is formed an arm 36 which carries a flexible flap 37 which forms a yieldable closure for the inlet opening 32. On the outer ends of the sleeve 35 is secured an arm 38. The rounded end 27 of the shaft 25 journals in the sleeve 35 and its squared portion 39 has secured thereon by means of the nut 40 a quadrant arm 41, which is provided with an arcuate slot 42. The bolt 43 extends through the arm 38 and the slot 42 and has provided thereon a wing nut 44.

The actuator 34 is secured on the top side 45 of the air duct 22, preferably between the pilot vane 24 and the wind box 23. Within the air duct 22 is also placed a control damper 46 which is rockably mounted on the shaft 47, whose ends journal in the vertical sides of the duct 22. The edge 48 of the damper 46 is flanged so that it will conform to the under side of the top 45 when the damper 46 is in the closed position shown in Fig. 4. It will be understood that air passes through the duct 22 in the direction indicated by the arrows 49.

The actuator 34 is in the form of a cylinder which is divided by a flexible diaphragm 50 which is held between the flanged edges 51 by means of the bolts 52. Secured on opposite sides of the diaphragm 50 are the discs 53 which are held in place by the nuts 53A on the rod 54 whose lower end 55 is hinged to the control damper 46 by means of the pin 56. The rod 54 extends through the opening 57 in the top 45 and the opening 58 in the bottom 59 of the actuator 34. The top 60 of the actuator 34 is provided with a vent 61 which is controlled by means of the thumb screw 62 which may be locked in position by means of the nut 63.

In the side 64 of the top 60 is formed a pocket 65 having a downwardly opening air inlet 66 upon which normally rests a ball check 67. The pocket 65 communicates with the chamber 68 in the upper portion of the actuator 34 by means of the port 69. It is desirable to provide a guard 70 around the upper side of the quadrant arm 41 and a similar guard 71 around the outer end of the control damper shaft 47.

The shaft 47 of the control damper 46 journals in the upright member 72 which is welded to the cover plate 28. The lower end 73 of the member 72 constitutes an indicator point. A nut 75 on the end of the shaft 47 secures the quadrant 74 to the shaft 47. The quadrant 74 is provided with an arcuate slot 76 through which extends a stud bolt 77 into the member 72.

In the automatic operation of this device, no nut is provided on the bolt 77 and the control damper 46 is free to move in response to the actuator diaphragm 50. When it is desired to dispense with the automatic operation of the controls, the nut 44 is removed from the bolt 43 which renders the pilot vane 24 incapable of operating the flap valve 37. The nut 44 is now placed on the bolt 77 and the quadrant 74 is clamped in any desired position where it will remain. There is no effort on the part of the actuator 34 to move the control damper 46 away from this position in view of the fact that the flap valve 37 closes the opening 32, and the pilot vane 24 is incapable of opening it.

Figure 4:
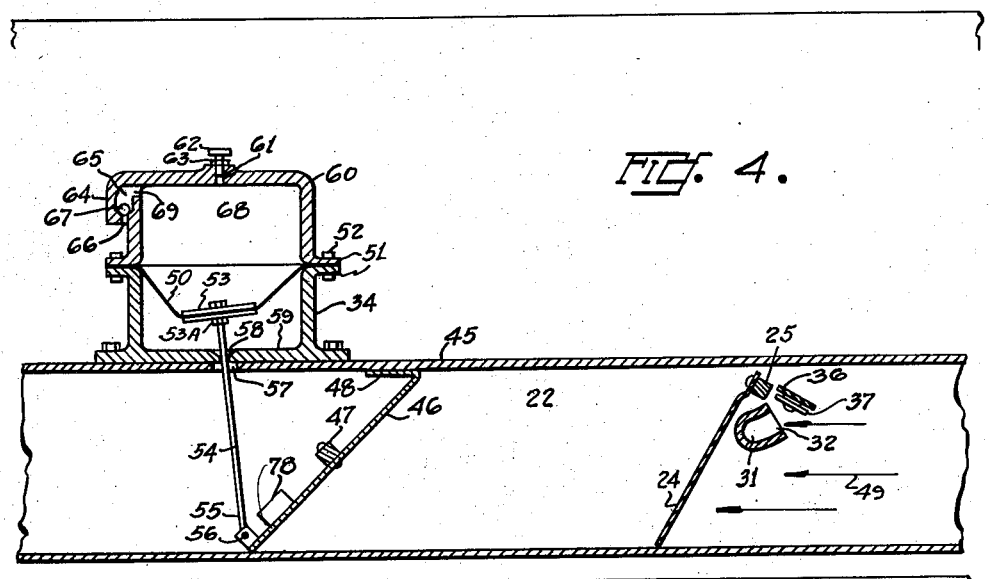
Fig. 4 is a view similar to Fig. 3 but showing the control damper closed.
Figure 5:
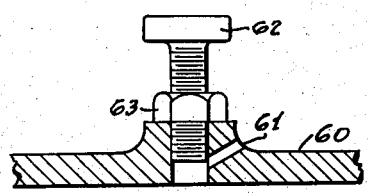
Fig. 5 is a section taken along the line 5—5 in Fig. 2.

Again referring to the automatic operation of the device, it will be seen that with the wing nut 44 on the bolt 43 and the quadrant 41 clamped in a predetermined position, that is, establishing a fixed relationship between the positions of the pilot vane 24 and the flap valve 37, any attempt on the part of the fan to drive air through the duct 22 while the control damper 46 is in the closed position shown in Fig. 4 will cause air to flow through the inlet opening 32 and the pipe 33 into the portion of the actuator 34 below the diaphragm 50. It will also be understood that when no air is being delivered to the duct 22, the control damper 46 is held in the closed position shown in Fig. 4 by means of a counterweight 78.

At the commencement of an air delivery to the duct 22, air enters the actuator 34 below the diaphragm 50 as stated causing the damper 46 to open slowly under the control of the screw 62, the inlet 66 being closed by the check 67. When the flow of air through the duct 22 raises the pilot vane 24 sufficiently far to cause the flap 37 to close or partly close the opening 32, there will be a reduction in the pressure on the under side of the diaphragm 50 and a corresponding closure of the damper 46. The purpose of the vent 61 is to cause a retarding action in the commencement of the air delivery to the combustion in order that the fuel delivery mechanism may have an opportunity to deliver fuel to the combustion somewhat in advance of the air delivery for the purpose of reducing the tendency to blow away partly consumed fuel when a full blast is instantaneously admitted to the fire. The purpose of the ball check 67 is to admit air to the chamber 68 when the stoker is shut down to facilitate the closing action of the control damper 46.

It will be noted that the quadrants 41 and 74 are graduated to facilitate the setting of the pilot vane 24 with relation to the flap valve 37 and to indicate the amount of air flowing past the control damper directing automatic operation, or to indicate the setting of the control damper when the automatic damper is inoperative.

While I have illustrated this device in connection with underfeed stokers, it must be understood that it may be used advantageously with overfeed stokers as well.

Attention is drawn to the co-pending applications of Max C. Richardson, Ser. No. 558,726, Max C. Richardson, Ser. No. 564,014, and Haskell C. Carter, Ser. No. 4,945, over which the device described in this application is an improvement.

I have illustrated the closure for the opening 32 as a flap valve 37 which is preferably resilient, although in some cases a resilient flap valve member would be objectionable and the opening 32 would be considerably reduced in size and a rigid closing member employed instead of the resilient one illustrated.

I claim:

A control for an air supply for stokers consisting of an air duct through which air may be delivered to a combustion chamber, said duct having mounted therein a floating pilot vane responsive to the flow of air through the duct, a balanced control damper mounted in said duct, a pneumatic actuator for said balanced control damper including a dash pot having a diaphragm forming one end thereof, said diaphragm having means for connecting same to said balanced damper in a manner that a movement of the diaphragm will rock said damper, said dash pot having a controllable outlet port and also having an inlet port provided with a check valve, said ports cooperating to provide an easy entrance of air into said dash pot and a restricted flow of air therefrom, an air supply pipe communicating between said actuator and the air duct, the inlet of said air supply pipe facing the flow of air through said air duct, said floating vane having a valve attached thereto adapted to close the inlet of said air supply pipe when said floating vane is raised above a predetermined position by an excessive flow of air through said duct.

HASKELL C. CARTER.